C. W. MERRILL.
PROCESS OF PRECIPITATING AND RECOVERING MATERIALS FROM SOLUTIONS.
APPLICATION FILED MAR. 1, 1911.
1,063,567.
Patented June 3, 1913.
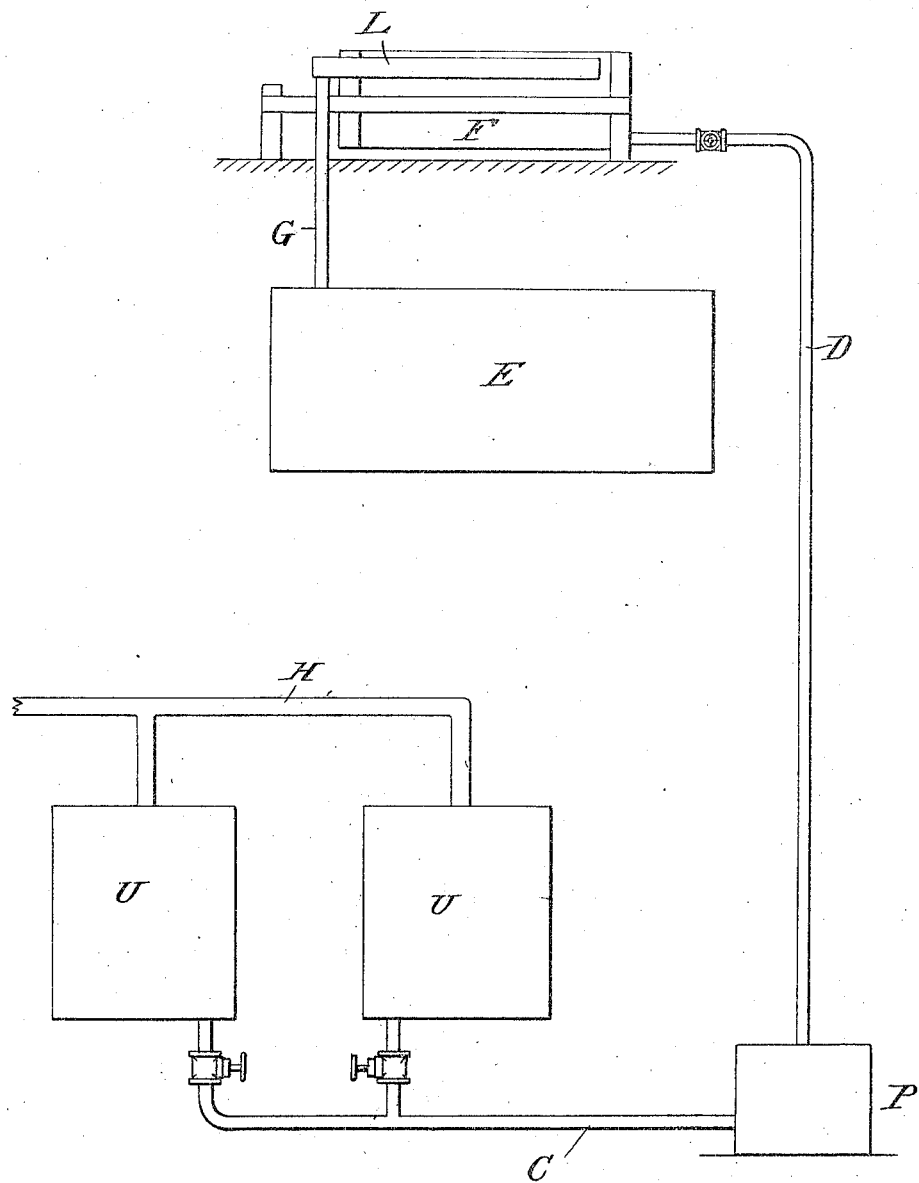

UNITED STATES PATENT OFFICE.

CHARLES W. MERRILL, OF BERKELEY, CALIFORNIA.

PROCESS OF PRECIPITATING AND RECOVERING MATERIALS FROM SOLUTIONS.

1,063,567.  Specification of Letters Patent.  Patented June 3, 1913.

Application filed March 1, 1911. Serial No. 611,722.

*To all whom it may concern:*

Be it known that I, CHARLES W. MERRILL, a citizen of the United States of America, and resident of Berkeley, Alameda county, State of California, have invented new and useful Improvements in Processes of Precipitating and Recovering Materials from Solutions, of which the following is a specification.

My invention relates to an improved process for precipitating and recovering valuable metal bearing material from solutions, and particularly metals from hydrometallurgical solutions.

I have heretofore, in Letters Patent of the United States No. 900,186, granted to me upon the 6th day of October 1908, described and claimed a process of precipitating and recovering materials from solution which consisted broadly in adding to the solution to be precipitated a precipitant while in motion, conducting the mixture without rest, or without contact with the atmosphere, to a filter, and then separating the solid from the liquid in such filter. The object of this process was primarily to precipitate and recover materials from solutions by means of the use of zinc bearing materials, as precipitants, under conditions which make for increased efficiency, as compared with earlier processes.

Now I have discovered as a result of the practical application of the invention referred to above, that it is desirable to maintain the reducing conditions not only to the entrance of the filter press itself, but also throughout the precipitation and filtration in such filter. In the methods heretofore used it has been found, first, that some mixtures filter so freely as not to keep the upper part of the container filled with the mixture, which upper portion of the container thereupon becomes occupied by atmospheric air or other oxidizing gases, which frequently are held dissolved in the cyanid solution which is being precipitated, second, that it is not always possible in the practical operation of reduction works, to deliver to the filter press continuously a sufficient feed of the mixture to keep it full, and third, that when the filter press is not in continuous use, which frequently occurs for various reasons, the same tendency exists, in the event of any leakage, for the material in the upper part of the containers to be displaced by air.

When the filtration has been conducted as heretofore in filters discharging at the bottom, all of the above difficulties may occur, and the result thereof is that the contact of the oxygen with the mixture, or its unfilterable component, oxidizes the precipitate and the precipitant contained in the press, and thus decreases the efficiency of precipitation, and increases the cost of the precipitant, as that portion of the latter which is oxidized is unavailable for future precipitation.

I have found any tendency to oxidation during the process to be so disastrous, that where it has been admitted, through any of the above causes or through mechanical defects in the piping or pumps used in the process, or through any other causes, the precipitation may not only be completely ineffective, but a re-solution of the valuable metals previously precipitated and collected in the filter, has occurred, so that the precipitated solution upon emerging from the filter has, in certain specific instances, when air has been purposely admitted to the suction chamber of the pump, exceeded the value in precious metals of the same solution before the precipitant was added to it.

The object of this invention is, therefore, to improve the process described in the above Letters Patent No. 900,186, by maintaining reducing conditions throughout the entire process of precipitation and collection of metal bearing material from its solution, and particularly from cyanid solutions of precious metals during the precipitation periods and the intervals between them.

The process is conducted in similar types of apparatus to those heretofore employed by me, up to the point where the mixture enters the filter. Thereafter the process differentiates from the former, in that the filter is kept constantly full of the mixture.

Various means may be resorted to for keeping the press full of liquid any one of which may be employed at will. Thus, for example, a bottom discharge may be employed in connection with a gage on the top of the press and devices are employed for throttling the discharge and keeping the press full as shown by the gage. Again, a bottom discharge may be used connected by means of pipes or hose so as to discharge at a point above the top of the press, or an ordinary discharge may be employed at or near the top thereof.

Any filter or filter press from which the atmosphere is completely excluded and which is capable of being maintained full of the mixture during the operation of the filtration, may be used in connection with this process.

In practice I prefer to use a zinc bearing material as a precipitant, such as finely divided zinc or zinc dust, or both. But any desired chemical or metal having the quality of displacing or precipitating that certain material from the solution which it is desired to recover, may be used.

The conduct of the process will be best understood by reference to the accompanying sheet of drawings.

In said drawings U is one or more receivers for the unprecipitated solution into which the zinc, fed by any suitable means, may be introduced. These receivers may be equipped with any suitable device for agitation of the mixture or the zinc may be fed to the solution at or near the point of exit from the receiver whence the mixture passes through the pipe C preferably to a pump P and thence through the discharge pipe D to a filter F equipped with suitable devices which prevent the admission of oxidizing gases. From the filter the filtrate passes by means preferably of a trough or pipe L discharging through G to any suitable receiver E for precipitated solution.

In the type of apparatus illustrated, tanks U are interposed between the containers in which the dissolution of the valuable contents from the crushed ore takes place, and the filter; and the zinc feed H is shown in this particular diagram leading to the tanks U, but I do not limit myself to any particular form of apparatus nor to adding the zinc at any particular point, but may add it either wet or dry at any point in the travel of the effluent solution between the container for crushed ore in which the dissolution of the valuable material takes place, and the filter in which the precipitate is collected, or I may add it direct to such filter. Neither do I limit myself to any particular method of conducting the unprecipitated solution from the container in which the dissolution takes place, to the filter. In the diagram herewith the filter is shown with a bottom feed and top discharge but I do not limit myself to any particular type of filter.

I am aware that zinc bearing materials have been used to precipitate metals from cyanid solutions by agitation in tanks and after agitation the mixture has been passed through filters, the remaining contents of the tank being at comparative rest until all of the mixture has been filtered, the serious disadvantages of which have been pointed out in my Patent No. 900,186. But I am not aware that the combination of conducting the mixture of solution and precipitant without rest, to a filter, and there separating the solid from the liquid under the precautions described for preventing contact with oxidizing gases has heretofore been employed, nor its advantages recognized.

I claim as my invention:

1. The method of maintaining reducing conditions throughout the precipitation of metal containing material from a cyanid solution, which consists in agitating said solution with a metallic precipitant, conveying the mixture without rest to a filter and excluding oxidizing gases from mixture during the precipitation periods and the intervals between them.

2. The process for precipitating and recovering material from its solution which consists in adding a precipitant to said solution while in motion, conducting the mixture without rest to a filter, and maintaining reducing conditions in the filter during the precipitation periods and the intervals between them.

3. The process for precipitating and recovering material from its solution which consists in adding a precipitant to the duct through which said solution is being conveyed to a filter and maintaining reducing conditions in the filter during the precipitation periods and the intervals between them.

4. The process for precipitating and recovering material from its solution which consists in conveying said solution to a pressure filter, simultaneously forcing a precipitant into said pressure filter with said solution and maintaining reducing conditions in the filter during the precipitation periods and the intervals between them.

5. The process for precipitating and recovering material from its solution which consists in adding a precipitant to the duct in which said solution is conveyed, forcing the mixture into the bottom of a pressure filter, and maintaining reducing conditions in the filter during the precipitation periods and the intervals between them.

6. The process for precipitating and recovering material from its solution, which consists in adding a precipitant to a solution in motion at a point adjacent to the outlet of said solution from a receiver, forcing the mixture through a pressure filter, and maintaining reducing conditions in the filter during the precipitation periods and the intervals between them.

In testimony, that I claim the foregoing as my invention, I have signed my name in presence of two witnesses, this twenty-eighth day of February, 1911.

CHARLES W. MERRILL.

Witnesses:
 CHARLES ENGEL,
 HENRY H. GRAFF.